United States Patent [19] … [11] 3,794,158
Greenwood, Jr. … [45] Feb. 26, 1974

[54] ACCUMULATING CONVEYOR SYSTEM
[76] Inventor: Walter Greenwood, Jr., 505 Brentwood Dr., Dearborn, Mich. 48124
[22] Filed: Feb. 24, 1972
[21] Appl. No.: 229,024

[52] U.S. Cl. .............................................. 198/223
[51] Int. Cl. ............................................ B65g 25/08
[58] Field of Search ............ 198/221, 218, 224, 223

[56] References Cited
UNITED STATES PATENTS

| | | | |
|---|---|---|---|
| 3,547,254 | 12/1970 | Manetta | 198/221 |
| 2,434,632 | 1/1948 | Young | 198/221 |
| 3,570,656 | 3/1971 | Manetta | 198/221 |
| 3,545,600 | 12/1970 | Rudlaff | 198/221 |

Primary Examiner—Evon C. Blunk
Assistant Examiner—Douglas D. Watts
Attorney, Agent, or Firm—Andrew R. Basile

[57] ABSTRACT

An accumulating conveyor system of the type having a pair of spaced longitudinally disposed frames on which a plurality of equally spaced article support stations are provided and through which articles are advanced from a load station at one end of the frames to an unload station at the opposite end of the frames. A plurality of conveyor modules are reciprocably mounted in directions paralleling the longitudinal axes of the frames with each module being so mounted as to be movable between a pair of adjacent stations. Each module comprises a housing having a reciprocably mounted actuating rod, the outer ends of which are adapted to alternately, engagably abut the outer ends of the actuating rods, respectively, carried by the modules immediately thereahead and therebehind. Article engaging levers carried by each module become operative upon movement of their associated actuating rods to engage an article in one of the associated support stations to transfer the article to the next forward adjacent station when the modules are reciprocated toward the unload station. Each support station has means for sensing whether the support station is empty and such sensing means is adapted to cooperate with an externally mounted lever carried by the module housing to cause reciprocal movement of its associated actuating rod and thereby actuate the article engaging levers to an operative position while at the same time the associated rod abuttably engages the rod of the module therebehind to shift the same and all rods therebehind to position their associated article engaging levers to an operative position thereby causing all articles carried in support stations behind the empty station to be advanced one station as the modules are reciprocated toward the unload station of the conveyor system. Means are provided to activate the actuating rod in the module associated with the load station of the conveyor so that all forwardly spaced modules actuating rods are shifted in such a manner as to position the article engaging levers to an inoperative position as the modules are reciprocated toward the load station back to the initial starting position.

11 Claims, 4 Drawing Figures

ACCUMULATING CONVEYOR SYSTEM

BACKGROUND OF THE INVENTION

1. Field of the Invention

The present invention relates to conveyor systems adapted to convey articles or workpieces and, in particular, the present invention relates to a conveyor system of the mechanical accumulating type.

2. Description of the Prior Art

Conveyor systems and, in particular, conveyor systems of the accumulating type are well known and have been employed in many manufacturing operations. In such conveyor systems for supplying articles to assembly stations it has been a practice to provide a multiplicity of stations together with means for advancing articles from station to station. Initially, means were provided that were responsive to the presence or absense of an article at each station such that when an empty station was sensed an article was advanced from the next rearmost station to fill this empty station. This resulted in vacating the previous station with a sequence of operations being required to move further or rearmost articles forwardly and the empty station itself was moved back to the beginning of the line and eventually it was eliminated by the loading of the conveyor at that point. For various reasons, articles are removed from intermediate stations between the loading and delivery stations along the conveyor and it is necessary that the system automatically function to advance articles from the load end of the conveyor to maintain each station filled at all times. It is particularly desirable to accomplish the foregoing results by a complete mechanical sensing control and actuating means which is not subject to the unavoidable failures encountered with electrical or electronically controlled systems.

A typical conveyor system which is operative to perform the aforementioned operation may take the form of a pair of elevated and spaced parallel support frames having equally spaced support stations on which the articles are deposited. A suitable conveyor such as a reciprocating or walking beam type is adapted to start from an initial position at the beginning of its stroke and engage the article, move the articles forwardly to the next position wherein the conveyor system disengages the articles and returns to its initial position. Generally such systems may comprise a sensing means positioned at each station and if the station is empty, the sensing means will position itself into an operating mode and cooperates with a suitable mechanism which will effect engagement with the articles to achieve the necessary advancement. In such systems, the entire mechanism for transferring the articles and for providing the mechanical accumulation of articles are exposed and subjected to possible damage because of contact from falling articles or the like. In addition, the entire system must be constantly lubricated as it is exposed to dirt and the like, all of which results in early deterioration and wear of the conveying system. Further, each known type of mechanical accumulating system must be designed to accomodate only the particular length of the conveyor in which it is to be initially employed, and thus these known systems are not readily adapted to change such as increasing or shortening the length of the conveyor without a major redesign, disassembly and reconstruction of the entire accumulating system. In addition, if a component of the system should become damaged and require replacement the entire line must be shut down for a substantial period of time while the damaged component is removed and a new component, which may not be on hand, must be ordered and be re-installed in the system.

It would therefore be desirable to provide a conveyor system which has all of the advantages of a full mechanical accumulating conveyor system without any of the aforementioned disadvantages.

SUMMARY OF THE INVENTION

The present invention which will be described subsequently in greater detail comprises a plurality of longitudinally spaced carrier modules which become operative when reciprocated relative to a plurality of equally spaced article support stations and which are adapted to engage articles carried by the support stations and advance them intermittently from a load station to an unload station. Each module is a self-contained, self-lubricating mechanism and cooperates with the module immediately therebehind when actuated by a sensing means associated with and responsive to an empty support station to position their article engaging means into engagement with said articles when the modules are reciprocated to thereby effect a transfer of all articles behind the empty station from one station to the next advanced station.

It is therefore an object of the present invention to provide a new means for constructing an accumulating conveyor system.

Other objects, advantages, and applications of the present invention will become apparent to those skilled in the art of accumulating conveyor systems when the accompanying description of one example of the present invention is read in conjunction with the accompanying drawings.

BRIEF DESCRIPTION OF THE DRAWINGS

The description herein makes reference to the accompanying drawings wherein like reference numerals refer to like parts throughout the several views, and in which.

DESCRIPTION OF THE PREFERRED EMBODIMENT

Figure 1:
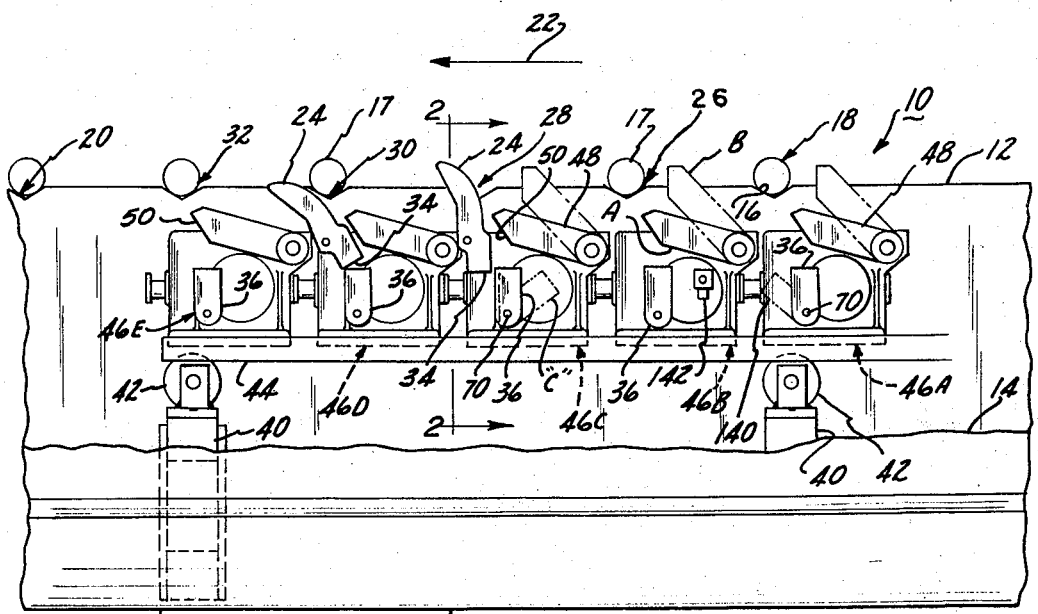
FIG. 1 is a fragmentary, partially sectioned side elevational view of an accumulating conveyor system constructed in accordance with the principles of the present invention.
Figure 2:
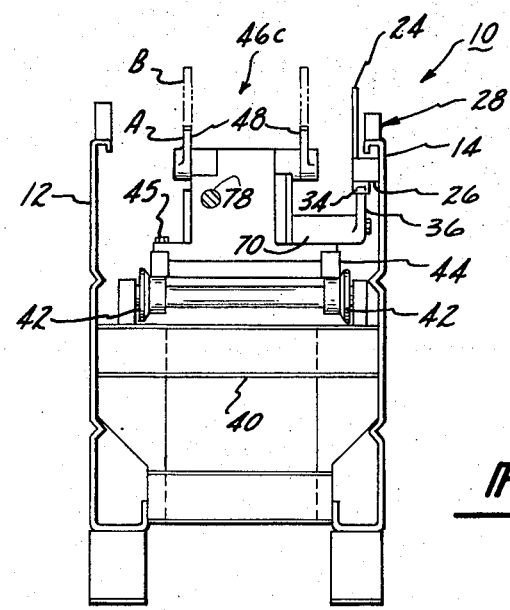
FIG. 2 is a fragmentary cross-sectional view of the accumulating conveyor system taken along line 2—2 in FIG. 1.

Referring now to the drawings and, in particular, to FIGS. 1 and 2, there is illustrated a simplified version of an accumulating conveyor system 10 presented merely to illustrate one example of how the present invention may be incorporated into a conveyor system. The conveyor system 10 comprises two parallel and elevated frames 12 and 14 having a plurality of equally spaced notches 16 which constitute and define article support stations on which, as viewed in FIG. 1, articles 17 are transferred from right to left as indicated by the arrow 22. The present conveyor system 10 is illustrated as having four intermediate article support stations 26, 28, 30 and 32 between a load station 18 and unload station 20. Although only two are illustrated, each article support station has associated therewith an article sensing lever 24. The article sensing levers 24 are carried by a bearing shaft 26 (FIG. 2) mounted to the vertical frame 14 and extending inwardly therefrom, the sensing levers 24 being such as to normally rotate about the shaft 26 and normally extend in a generally vertical position when their associated support station is empty as is shown in FIG. 1 at the article support station 28. When an article 17 is supported at a work station such as the work station 30, the article 17 engages the article sensing lever 24 and rotates the lever 24 counter-clockwise, as seen in FIG. 1, to raise the lower end 34 thereof upwardly a sufficient distance so that the same will not be engaged by an actuating lever 36 carried by each of the modules and which will be described in greater detail hereinafter. As can be seen in FIGS. 1 and 2, when a workpiece support station is empty, the sensing lever 24 will remain in an upright position and thus the lower end 34 will be engaged by the actuating lever 36 as the same passes by the sensing lever 24, all of which will be explained in greater detail hereinafter.

The article support frames 12 and 14 are interconnected by transverse beams 40 which have at their top ends rollers 42 that provide a sliding support for a longitudinal carrier support member 44 which may be reciprocated along the longitudinal axes of the frames 12 and 14 therebetween by any suitable means, such as a hydraulic cylinder or the like. The carrier support member 44 has fixedly mounted to the top surface thereof by means of fasteners 45 (FIG. 2) a plurality of longitudinally aligned identical carrier modules 46a through 46e. Since the carrier modules 46a-e are each substantially identical in construction, only one will be described in greater detail, however, it is to be understood that the description of one is equally applicable to the others. The modules 46a-e carried by the carrier support 44 are reciprocated as a unit relative to the support stations and are adapted to engage the article 17 carried by the support frames to advance the article 17 to the next forward station.

Each of the modules 46a-e has a pair of article engaging fingers 48 which are movable between a first position A wherein the fingers 48 are in a lowered position and will not engage the articles 17 adjacent their associated module, and movable to a second position B wherein the upper face 50 of each raised article engaging finger 48 is adapted to engage the article 17 adjacent its associated module 46 to move the article 17 to the next forward support station as its associated module is moved relative to the frames 12 and 14.

Figure 3:
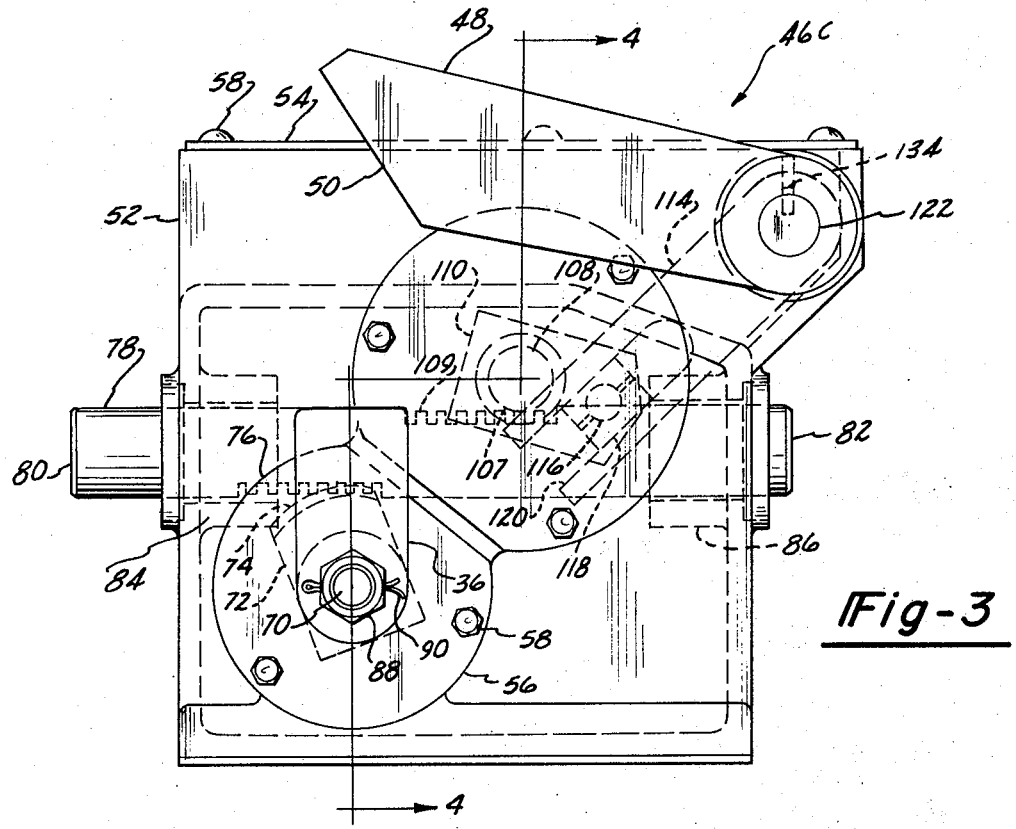
FIG. 3 is an enlarged fragmentary view of the accumulating conveyor system shown in FIG. 1.
Figure 4:
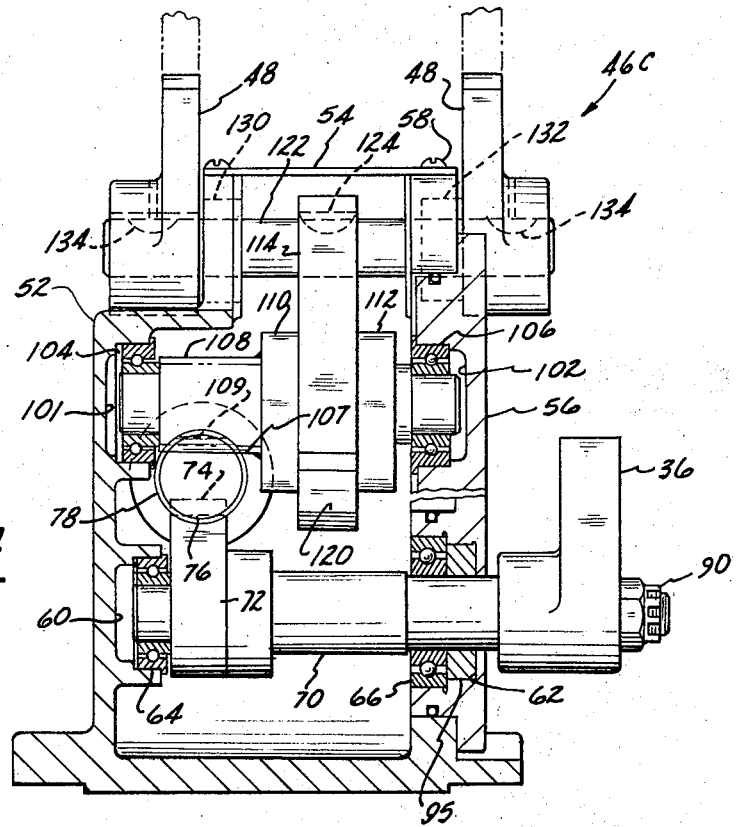
FIG. 4 is a cross-sectional view of the conveyor system taken along line 4—4 of FIG. 3.

Turning now to FIGS. 3 and 4, the module 46c is shown as comprising an enclosed hollow housing 52 having an access top cover 54 and a side cover 56 secured to the housing 52 by any suitable means such as screws 58. The covers 54 and 56 permit access into the interior of the enclosed housing 52 to permit assembly and lubrication of the same. With particular reference to FIG. 4, the housing 52 is shown having a pair of internal recesses 60 and 62 which fixedly mount ball bearings 64 and 66. The bearings 64 and 66 rotatably support a shaft 70 which, in turn, mounts a gear 72 having teeth 74 adapted to engage gears 76 formed on an actuating rod 78, the opposite ends 80 and 82 of which are respectively slidably mounted in bronze bushings 84 and 86 such that the outer ends 80 and 82 of the rod 78 extend forwardly and rearwardly of the module 46c. Thus, the axis of the actuating rod 78 lies in a plane which is perpendicular to the axis of the shaft 70 and parallel to the direction of reciprocation of the modules 46. The shaft 70 extends through the recess 62 and externally of the housing 52 and mounts the aforementioned actuating lever 36 which is secured thereto by any suitable means such as by bolt 88 and carter pin 90. A fluid seal 95 in recess 62 prevents the passage of fluid externally of the housing 52.

The interior of the housing 52 has a second pair of opposing recesses 101 and 102 fixedly supporting roller bearings 104 and 106 which, in turn, rotatably carry a crank shaft 108. The crank shaft 108 has gear teeth 107 which mesh with gear teeth 109 on the upper surface of the actuating rod 78 such that the crank shaft 108 will rotate when the rod 78 reciprocates. The crank shaft 108 fixedly mounts a pair of crank plates 110 and 112 which have slidably sandwiched therebetween the inner end of a connecting arm 114. The inner ends of each plate 110 and 114 are connected by a crank pin 116 (FIG. 3) which is rotatably mounted in a bearing 118. The inner end of the connecting arm 114 has a U-shaped slot 120 which slidably accomodates the outer surface of the bearing 118 such that when the crank shaft 108 is rotated, as seen in FIG. 3, in a counter-clockwise direction, the rotational movement of the plates 110 and 112 will be transferred to the connecting arm 114 to rotate the same in a clockwise direction about the axis of a crank arm shaft 122. As can best be seen in FIG. 4, the upper end of the connecting arm 114 is fixedly attached to the crank arm shaft 122 by means of a woodruff key and slot arrangement 124.

The outer ends of the shaft 122 are supported by roller bearings 130 and 132 carried within the housing and the outer ends of the shaft 122 extend outwardly from the housing 52 for fixed attachment to the article engaging fingers 48. The fingers 48 are attached to the outer ends of the shaft 122 by any suitable means, as, for example, by means of the woodruff key and slot arrangement 134.

Referring now to FIG. 3, it can be seen that when the actuating lever 36 engages the lower end 34 of a sensing lever 24 as the module 46c is being reciprocated to the left as viewed in FIG. 1, the actuating lever 36 will be rotated clockwise to the position C rotating the shaft 70 in the same manner causing a driving engagement between the gears 72 and 74 and thereby reciprocating the rod 78 to the right as seen in FIG. 1. As the rod 78 is reciprocated to the right, the driving engagement of the gears 107 and 109 will result in the shaft 108 rotating in a counter-clockwise direction with the sliding coupling between the connecting arm 114 and the shaft 108 resulting in a clockwise rotation of the connecting arm 114. Due to the fixed attachment between the upper end of the connecting arm 114 and the shaft 122 and the fixed attachment of the fingers 48 and the outer ends of the shaft 122, the fingers 48 will be rotated in a clockwise direction and raised from their lowered, non-operative position A to their raised, article engaging position B, as aforementioned.

Each module 46 is associated with two adjacent pairs of support stations. For example, the module 46a is associated with the load station 18 and the work support station 26 while the module 46b is associated with the article support stations 26 and 28, the module 46c is associated with the article support stations 28 and 30, the module 46d is associated with the article support stations 30 and 32 and the module 46e is associated with the work support station 32 and the unload station 20. Thus, when the article engaging fingers 48 of the module 46a are in the raised position B, the article engaging faces 50 will engage the article 17 in the load station 18 when the carrier support 44 is reciprocated to the left, as viewed in FIG. 1, and the article 17 will be transferred to the next adjacent station 26. Simultaneously therewith the article engaging fingers 48 carried by the module 46b when in a raised position will engage the article 17 carried in the article support station 26 and move it forwardly to the next adjacent station 28. Likewise, the article engaging fingers 48 associated with the modules 46c, 46d and 46e will engage the articles 17 carried respectively in the article support stations 28, 30 and 32 and move them forwardly, respectively, to the support stations 30 and 32 and the unload station 20.

However, in the example illustrated, the unload station 20 is filled and thus a transfer of the articles from support stations 30 and 32 would result in an overflow of articles at the unload end of the conveyor. Thus it is necessary that the articles in the support stations 30 and 32 not be engaged by the fingers 48 of their associated modules 46d–e so that these articles remain in position while the articles therebehind are advanced one station so as to fill the empty position at the article support station 28. Since the article support station 28 is empty, the sensing lever 24 be in a vertical position wherein the lower end 34 thereof will engage the actuating lever 36 as the modules are reciprocated leftwardly by means of the support member 44. Due to this engagement between the actuating lever 36 and the sensing lever 24, the article engaging fingers 48 associated with the module 46c are raised from their lowered inoperative position A to their raised operative position B, while at the same time the engagement of the gear 72 with the gear 74 on the longitudinal rod 78 causes the same to be reciprocated to the right, toward the load station 18 whereupon the outer end 82 of the rod 78 abuttably engages the outer end 80 of the rod 78 within the module unit 46b causing the same to be reciprocated to the right whereupon the internal mechanism of the module unit 46b will cause the fingers 48 carried thereby to be raised from the lowered position A to the raised position B, positioning the article engaging face 50 adjacent the article 17 carried within the article support 26 such that the article 26 will be transferred from the article support 26 to the article support 28 as the modules are reciprocated leftwardly under the reciprocal movement of the support 44.

Simultaneously therewith, the outer end 82 of the rod 78 carried by the module 46b will engage the left end 80 of the rod 78 carried by the module 46a and reciprocate it to the right towards the load station 18 resulting in the fingers 48 carried by the module 46a to be raised from the lowered inoperative position A to the raised operative position B wherein the fingers 48 will engage the article 17 carried by the load station and move the same to the support station 26 as the support 44 is reciprocated. Thus, whenever any intermediate module has its fingers 48 placed in the operative position B so as to engage the article associated therewith all modules to the rear, that is toward the load station 18 will be automatically activated by means of the rods 78 such that their associated article engaging fingers 48 are raised to the operative position B.

After the modules 46 have been reciprocated toward the unload station so as to advance the articles 17 to the next adjacent stations, the support 44 is reciprocated in an opposite direction, that is toward the load station 18. As can best be seen in FIG. 1, the rearmost module in the series of modules, that is the module 46b associated with the load station 18 is provided with a second inclined lever 140 which is fixedly attached to the shaft 70. When the modules 46 are first reciprocated toward the unload station 20, the actuating lever 36 is inclined to the right or clockwise as aforementioned, positioning the second lever 140 into a vertical position. As the module 46a moves toward the article support station 26 carrying the article 17 from the load station 18, the vertically disposed lever 140 will pass under a wipe off dog 142 which is mounted so that it pivotally moves in a counter-clockwise direction as engaged by the left edge of the lever 140 and thus during reciprocal movement of the module 46a toward the unload station 20, the wipe off dog 142 is inoperative. During the return motion, that is, as the modules are reciprocated toward the load station 18, the wipe off dog 142 will engage the right edge of the lever 140 and cause the same to rotate counter-clockwise, returning the actuating lever 36 to its initial vertical position. As the actuating lever 36 is returned to its initial vertical position, the rod 78 associated with the module 46a is reciprocated to the left resulting in the article engaging fingers 48 being lowered from their raised operative position B to the lowered inoperative position A while at the same time the rod end 80 engages the rod end 84 of the module 46b reciprocating it leftwardly and each successive rod 78 is engaged by the rod immediately therebehind causing all of the modules ahead of the modules 46a to move their associated article engaging fingers 48 from the raised operative position B down to the lowered inoperative position A whereby all the modules are in their initial starting position and ready to commence a new cycle.

It can thus be seen that the present invention provides a unique means for constructing an accumulating conveyor system which is purely mechanical in its construction and thus is not subject to the normal failures incurred in electrical or electronically operated systems.

It can also be seen that since each module is self-contained and self-lubricating, there is no concern for dirt entering into the mechanism or for injury thereto as the housing is constructed of a substantially strong material, such as aluminum or a lightweight steel.

It can also be seen that each module may be designed to accomodate any spacing between article support stations while the length of the conveyor may be easily changed by simply removing or adding more modules without the complicated redesign, disassembly and reconstruction as is necessary in presently existing systems.

It can also be seen that in the event one of the modules should fail it can be easily removed and replaced as the same are simply held to the support member 44 by any suitable fastening means such as the aforementioned fastening means 45.

Although only one form of the present invention has been disclosed, it should be apparent to those skilled in the art of accumulating conveyor systems that other

What is claimed is as follows:

1. An accumulating conveyor system comprising:

a longitudinal frame having a plurality of equally spaced article support stations through which articles are advanced intermittently from a load station to an unload station on said frame;

sensing means associated with each of said support stations to determine whether its associated support station is empty;

a plurality of longitudinally spaced conveyor modules, each module comprising an enclosed housing mounted for reciprocal movement along the longitudinal axis of said frame, each module being associated with a pair of adjacent stations;

transfer means carried by each module housing and responsive to the sensing means associated with one of said pair of adjacent stations immediately thereahead when said modules are reciprocated in one direction and when said one immediately ahead station is empty so as to become operative to engage the article in the other of said pair of associated stations immediately there-behind to transfer said article from said other station to said one station, said transfer means not being made operative by said sensing means when the station associated therewith is not empty;

actuating means carried by within each of said module housings, said actuating means comprising a reciprocating rod means having its opposite ends extending outwardly from its associate housing for positioning into an operative position the transfer means of all modules behind the module whose transfer means becomes operative in response to its associated sensing means; and means associated with the module disposed at the load station of said frame to coact with said actuating means to place said transfer means of all modules thereahead into an inoperative position when said plurality of conveyor modules is reciprocated in an opposite direction, whereby said articles are advanced forwardly to the next immediate station only if an empty station is thereahead.

2. The accumulating conveyor system defined in claim 1 further comprising:

means for reciprocating said modules in back and forth strokes to move said modules from one of their associated stations to the other of their associated stations and return said module to said one associated station;

said transfer means comprising an article engaging means carried by each of said modules;

said article engaging means being movable to a first position wherein said article engaging means is operable to engage an article supported in said one associated station and transfer said article to said other associated station and a second position wherein said article engaging means is inoperative; and said article engaging means remaining in said second position unless actuated by said sensing means.

3. An accumulating conveyor system comprising:

a longitudinal frame having a plurality of equally spaced article support stations through which articles are advanced intermittently from a load station to an unload station on said frame;

sensing means associated with each of said support stations to determine whether its associated support station is empty;

a plurality of longitudinally spaced conveyor modules adapted for reciprocal movement along the longitudinal axis of said frame, each module being associated with a pair of adjacent stations;

transfer means carried by each module and responsive to the sensing means associated with one of said pair of adjacent stations immediately thereahead when said modules are reciprocated in one direction and when said one immediately ahead station is empty so as to become operative to engage the article in the other of said pair of associated stations immediately therebehind to transfer said article from said other station to said one station, said transfer means not being made operative by said sensing means when the station associated therewith is not empty;

actuating means carried by each of said modules for positioning into an operative position the transfer means of all modules behind the module whose transfer means becomes operative in response to its associated sensing means;

means associated with the module disposed at the load station of said frame to coact with said actuating means to place said transfer means of all modules thereahead into an inoperative position when said plurality of conveyor modules is reciprocated in an opposite direction, whereby said articles are advanced forwardly to the next immediate station only if an empty station is thereahead;

each of the actuating means in each module comprises a longitudinal reciprocating rod means having its opposite ends extending outwardly from its associated module;

said opposite ends of said rod means being longitudinally aligned with the outer end of adjacent rod means in adjacent modules;

said ends of said rod means being adapted to alternately engagably abut the ends of its adjacent rod means in adjacent modules;

each of said rod means being movable to a first position toward the load station of said frame when said modules are reciprocated toward the unload station to actuate its associated transfer means and place the same in an operative position, and movable to a second position toward the unload station of said frame when said modules are reciprocated toward the load end of said frame to place said transfer means into an inoperative position;

a rod means in a module associated with a station that is empty being actuated by said sensing means to move said rod means to said first position and abuttably engage the rod means therebehind to move all of said rod means therebehind to said first rod means position; and said rod means being adapted to abuttably engage the ends of rod means immediately thereahead when said rod means is moved to its second position so as to move all successive rods of the modules thereahead to said second position.

4. The accumulating conveyor system defined in claim 3 wherein:

said transfer means further comprises an external lever means carried by each module and operatively connected to said rod means of its associated module; and said external lever means cooperating with the sensing means associated with an empty station to move said rod means associated therewith to said first position when said modules are reciprocated toward said unload station.

5. The accumulating conveyor system defined in claim 4 wherein:

said rod means and said transfer means of each module are enclosed in a sealed housing;

said external lever means extending outwardly therefrom for engagement with said sensing means; and said transfer means further comprising an externally mounted article engaging means engaging said articles to cause a transfer thereof when said modules are reciprocated toward said unload station.

6. A conveyor module adapted for use in an accumulating conveyor system of the type having a longitudinal frame with a plurality of equally spaced article support stations through which articles are advanced intermittently from a load station to an unload station of said frame and in which sensing means are provided at each support station to determine whether its associated support station is empty;

said conveyor module being adapted to be positioned for reciprocal movement with respect to said longitudinal frame and associated with one pair of adjacent stations;

said conveyor module comprising an enclosed housing having a pair of opposed bores;

an actuating rod reciprocably mounted in said housing bores along an axis parallel to the direction of reciprocal movement of said module;

means in said housing for moving said actuating rod back and forth such that the opposite ends of said actuating rod are adapted to alternately engagably abut the outer ends respectively of rods carried by the modules immediately ahead and immediately behind said housing;

article engaging means carried by said housing and movable upon actuation between a first position wherein said article engaging means is positioned to engage the article disposed in one of said pair of adjacent article supports and transfer said article to the other of said pair of article supports when said module is reciprocated in one direction and a second position wherein said article engaging means is so positioned as to not engage an article disposed in said one article support when said module is reciprocated in said one direction; and means carried in said housing operatively connecting said article engaging means to said rod such that when said rod is reciprocated in said one direction said article engaging means is moved to said second position and when said rod is reciprocated in an opposite direction said article engaging means is moved to said first position.

7. A conveyor module adapted for use in an accumulating conveyor system of the type having a longitudinal frame with a plurality of equally spaced article support stations through which articles are advanced intermittently from a load station to an unload station of said frame and in which sensing means are provided at each support station to determine whether its associated support station is empty;

said conveyor module being adapted to be positioned for reciprocal movement with respect to said longitudinal frame and associated with one pair of adjacent stations;

said conveyor module comprising an enclosed housing having a pair of opposed bores;

an actuating rod reciprocably mounted in said housing bores along an axis parallel to the direction of reciprocal movement of said module;

the opposite ends of said actuating rod being adapted to alternately engagably abut the outer ends respectively of rods carried by the modules immediately ahead and immediately behind said housing;

article engaging means carried by said housing and movable upon actuation between a first position wherein said article engaging means is positioned to engage the article disposed in one of said pair of adjacent article supports and transfer said article to the other of said pair of article supports when said module is reciprocated in one direction and a second position wherein said article engaging means is so positioned as to not engage an article disposed in said one article support when said module is reciprocated in said one direction;

means carried in said housing operatively connecting said article engaging means to said rod such that when said rod is reciprocated in said one direction said article engaging means is moved to said second position and when said rod is reciprocated in an opposite direction said article engaging means is moved to said first position;

means carried externally of said housing and operatively connected to said rod; and said externally mounted means cooperating with said sensing means when said station associated with said sensing means is empty to move said rod means in said other direction whereby said article engaging means is moved to said first position.

8. The module defined in claim 7, further comprising a plurality of said modules mounted adjacent said support stations in a longitudinally spaced manner, the outer ends of the rods of each module respectively abutting the outer end of the rod carried by the module immediately ahead and immediately therebehind;

all of said modules having their article engaging means moved to said first position when their associated rod means are reciprocated in said other direction; and all of said module rods being shifted in said other direction when any module thereahead has its externally mounted means cooperatively engaged with a sensing means associated with an empty support station while all modules ahead of said empty station have rods which are not abuttably engaged by the module associated with said empty station.

9. The conveyor module defined in claim 8, wherein the module associated with the load end of said frame has additional external means cooperating with said frame to move said rod in said one direction when said modules are moved in said other direction;

said actuating rod associated with said last mentioned module having its other end abuttably engaging the outer end of the rod carried by the module immediately thereahead, which rod is moved in said one direction and each successive rod in the module thereahead is moved in said one direction whereby all of the article engaging means of all modules ahead of said first module are moved to said second position such that said article engaging means do not engage said articles when said modules are reciprocated in said other direction.

10. An accumulating conveyor system comprising:

a longitudinal frame having a plurality of equally spaced article support stations through which articles are advanced intermittently from a load station to an unload station on said frame;

sensing means associated with each of said support stations to determine whether its associated support station is empty;

a plurality of longitudinally spaced conveyor modules;

support means supporting said modules such that each of said modules is associated with a pair of adjacent stations;

reciprocating means for reciprocating said support means in back and forth strokes to move said modules from one of their associated stations to the other of their associated stations and return said modules to said one associated station, each of said modules having article engaging means movable to a first position wherein said article engaging means is operable to engage an article supported in said one associated station and move said article to said other associated station, and a second position wherein said article engaging means is inoperative, said article engaging means being normally in said second position;

an internal actuating means in each of said modules, each of said actuating means being operable to move said article engaging means to said first and second positions;

each of said actuating means further comprising a longitudinal reciprocating rod means within said module and having its opposite ends extending outwardly from its associated module, said opposite ends of each rod means being longitudinally aligned with the outer ends of adjacent rod means in adjacent modules, said ends of said rod means being adapted to alternately engagably abut the ends of the rod means in adjacent modules, each of said rod means being movable to a first position toward the load station of said frame to actuate said actuating means to move its associated article engaging means to said first position, and movable to a second position toward the unload station of said frame to actuate said actuating means to move said article engaging means to said second position;

said rod means abuttably engaging the end of the rod means immediately thereahead when said rod means is moved to said second position to move all of the successive rods in the modules ahead of said empty station to said second position;

external dog means carried by each module and operatively connected to its associated actuating means and rod means;

said external dog means cooperating with the sensing means associated with said other associated station when same is empty to actuate said actuating means and said rod means to move its associated article engaging means and its associated rod means to their first positions when said module support means is reciprocated toward said unload station; and means associated with the module disposed at the unload station of said frame to move the rod means therein to said second position and all rod means associated with modules ahead of said load module when said module support means is reciprocated toward the load end of said frame.

11. An accumulating conveyor system comprising:

a longitudinal frame having a plurality of equally spaced article support stations through which articles are advanced intermittently from a load station to an unload station on said frame;

sensing means associated with each of said support stations to determine whether its associated support station is empty;

a plurality of longitudinally spaced conveyor modules adapted for reciprocal movement along the longitudinal axis of said frame, each module being associated with a pair of adjacent stations;

transfer means carried by each module and responsive to the sensing means associated with one of said pair of adjacent stations immediately thereahead when said modules are reciprocated in one direction and when said one immediately ahead station is empty so as to become operative to engage the article in the other of said pair of associated stations immediately therebehind to transfer said article from said other station to said one station, said transfer means not being made operative by said sensing means when the station associated therewith is not empty;

actuating means carried by each of said modules for positioning into an operative position for transfer means of all modules behind the module whose transfer means becomes operative in response to its associated sensing means;

means associated with the module disposed at the load station of said frame to coact with said actuating means to place said transfer means of all modules thereahead into an inoperative position when said plurality of conveyor modules is reciprocated in an opposite direction, whereby said articles are advanced forwardly to the next immediate station only if an empty station is thereahead;

each of the actuating means in each module comprising a longitudinal non-pivoting reciprocating rod means movable in opposite directions along the same linear path and having its opposite ends extending outwardly from its associated module;

said opposite ends of said rod means being longitudinally aligned with the outer end of adjacent rod means in adjacent modules;

said ends of said rod means being adapted to alternately engageably abut the ends of its adjacent rod means in adjacent modules;

each of said rod means being linearly movable in a direction along said linear path toward the load station of said frame to a first position when said modules are reciprocated toward the unload station to actuate its associated transfer means and place the same in an operative position, and linearly movable in an opposite direction along said linear path toward the unload stations of said frame to a second position when said modules are reciprocated toward the load end of said frame to place said transfer means into an inoperative position;

the rod means in the module associated with a station that is empty being actuated by said sensing means to move said rod means to said first position and abuttably engage the rod means therebehind to move all of said rod means therebehind to said first rod means position; and said rod means being adapted to abuttably engage the ends of rod means immediately thereahead when said rod means is moved to its second position so as to move all successive rods of the modules thereahead to said second position.

* * * * *